UNITED STATES PATENT OFFICE.

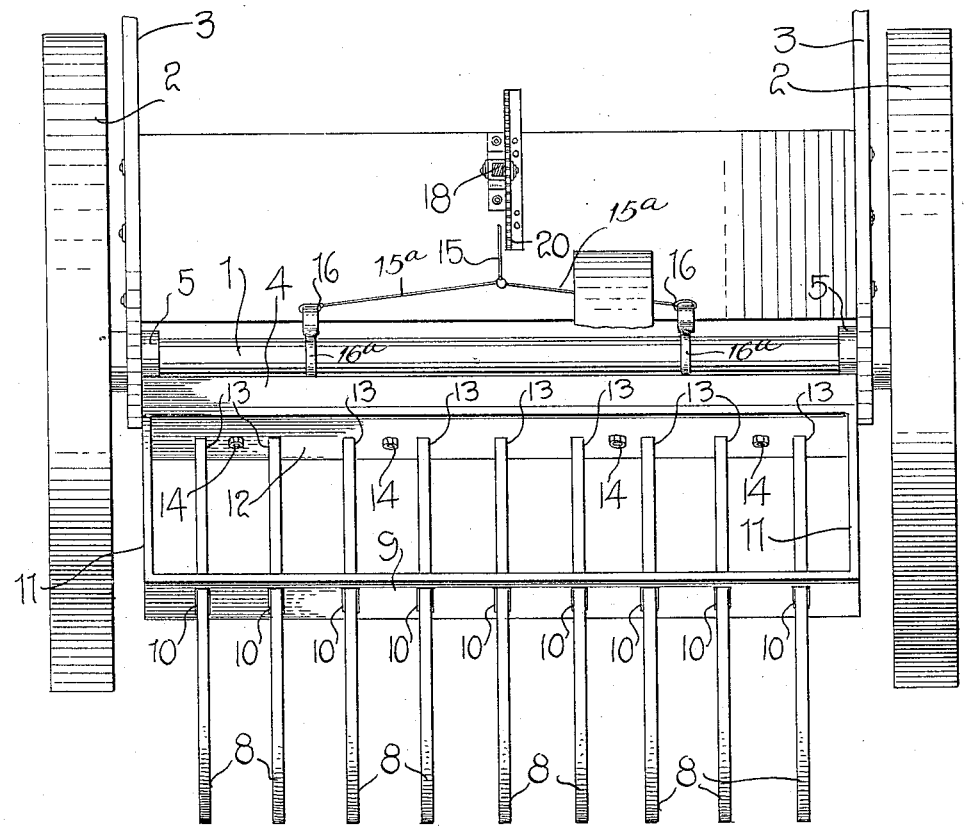
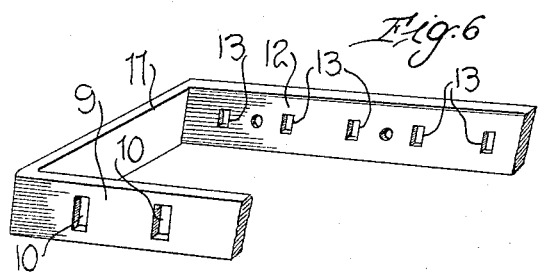

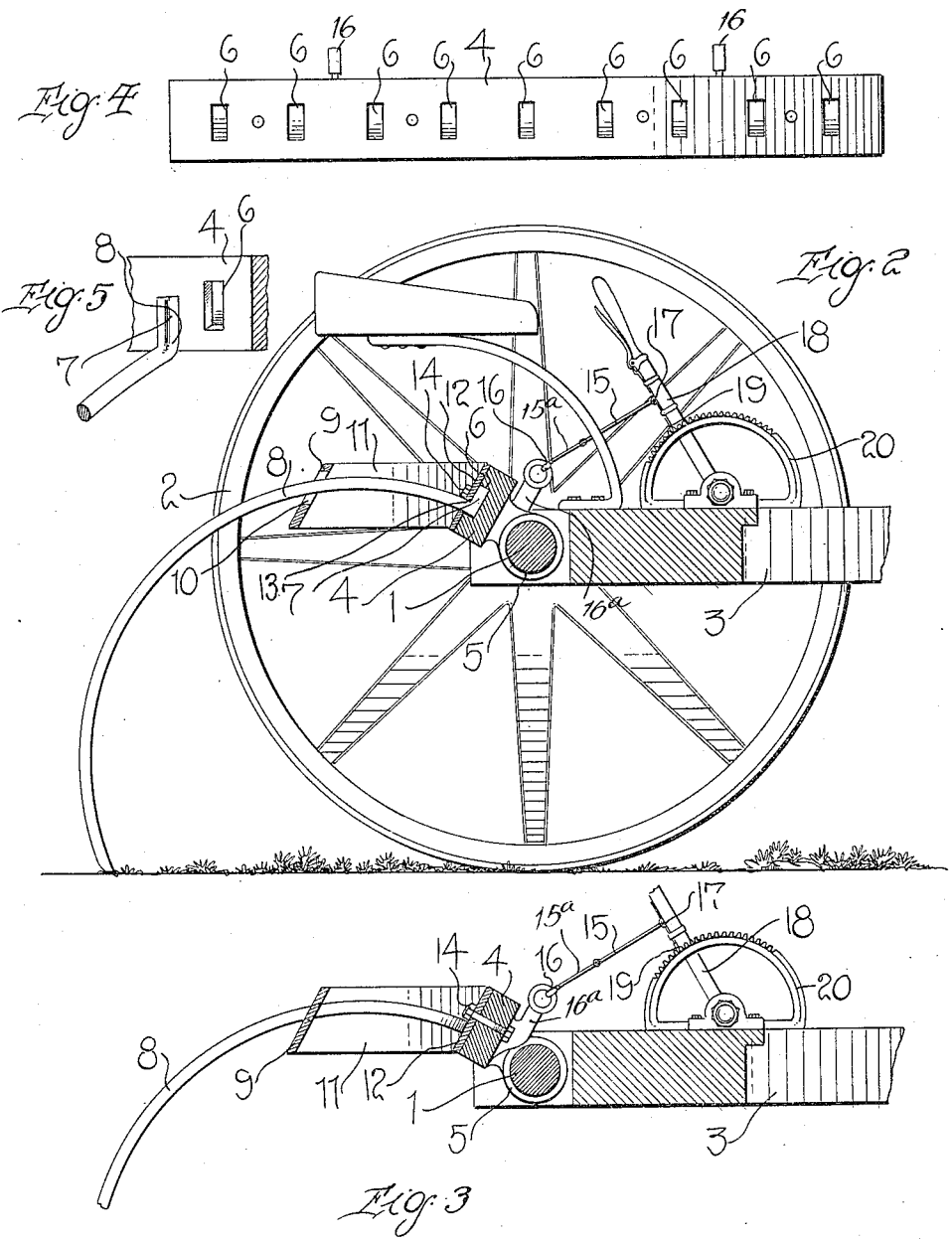

FRED J. FOWLER, OF ROME, GEORGIA.

AGRICULTURAL IMPLEMENT.

1,152,086.  Specification of Letters Patent.  Patented Aug. 31, 1915.

Application filed April 15, 1914. Serial No. 832,046.

*To all whom it may concern:*

Be it known that I, FRED J. FOWLER, citizen of the United States, residing at Rome, in the county of Floyd and State of Georgia, have invented certain new and useful Improvements in Agricultural Implements, of which the following is a specification, reference being had to the accompanying drawings.

This invention relates to agricultural implements and particularly to an implement for gathering stones upon the field and has for its primary object the provision of a portable, and preferably wheeled frame provided with a collecting mechanism including a series of yieldable or resilient tines carried by a common rocking member and arranged whereby the member may be effectually tilted to effect different positions of the effective surface engaging ends of the tines with the soil.

A further object of the invention is to so construct the tine supporting means that the tines may be readily disengaged therefrom or readily applied thereto and when in engagement are held firmly in place, the means for spacing the tines from each other also serving as means for holding the tines locked.

A still further object of the invention is the provision of a spacing means which, while serving to properly separate the tines from each other will also permit the tines to have free vertical play.

For a full understanding of the invention, reference is to be had to the following description and accompanying drawing, in which—

Figure 1 is a top plan view of the machine; Fig. 2 is a longitudinal section therethrough; Fig. 3 is a sectional view of a portion of the tilting member. Fig. 4 is a plan view of the rocking head; Fig. 5 is a sectional perspective view of a portion of the head and one of the trailing tines; Fig. 6 is a sectional perspective view of the retainer and spacing member.

The machine consists of a wheeled axle 1, the wheels 2 thereof being designed to freely revolve on the axle and as illustrated, said axle is connected with a suitable draft frame 3. This frame may be of any suitable well known design and a further detail description thereof will not be necessary to a proper understanding of the collecting mechanism. At this time, it is desired that it be understood that the mechanism for the actual collection of the stones or objects upon the field is not only constructed for the purpose of effecting a proper application of the effective collecting ends of the tines with the soil as the occasion may demand, but the mechanism generally is constructed with a view to rendering the same relatively compact and of a nature whereby it may be readily connected with any portable wheeled frame such as the one previously referred to.

The collecting mechanism consists of a head 4 provided with brackets carrying terminal collars 5 through which the axle 1 loosely extends. This head has a length whereby its ends lie adjacent to the supporting wheels 2 and between the ends and formed in one surface of the head are short substantially rectangular seats 6, which receive like-shaped lugs 7 carried by the inner end of the collecting tines 8 disposed at right angles thereto. These tines are suitably curved and are possessed of the proper resiliency to permit of their engaging the surface of the soil yieldably. It is essential that the tines be disposed in parallel spaced relation to each other and to the head, and the arrangement of the recesses 6 will in a measure, secure the result, but as will be obvious additional means must be provided to hold the intermediate portions of the tines positively spaced from each other, and also to secure the effective retention of the tines against accidental disconnection from the head. This part of the apparatus consists of a one-piece rectangular frame embodying a tine spacing bar 9 provided with transversely disposed tine receiving slots 10 of a length to permit a limited yielding movement of the tines, a time locking bar 12 provided with slots 13 of approximately the same size as the transverse area of the tines, and with openings to receive bolts 14 by which it is clamped to the head, and two end bars 11, the bars 9 and 12 being disposed obliquely to the bars 11 and parallel with each other.

While the bar 9 is described primarily as a spacer, it is to be noted that it performs another function namely that of a deflector upon which the stones will come in contact and finally free themselves from between adjacent tines, during the collecting operation. Such arrangement of the bar is important as it will prevent the stones from becoming unduly bound between the teeth as will be understood.

In order that the collecting mechanism may be tilted, to respectively move the tines to active and inactive positions, I provide controlling means consisting of a link 15 that carries two laterally projecting arms 15ª, the ends of which are secured in eyes 16 carried by the upper ends of a pair of brackets 16ª projecting forwardly from the head 4 and spaced some distance from the collars 5. The outer end of the link is secured at 17 to a rocking lever 18 mounted upon the frame 3 and it is provided with a locking dog 19 which is adapted to coact with a rack segment 20 mounted upon the frame 3 and designed to positively hold the tilting head 4 in any desired position. When leaving a field, the lever 18 may be rocked so as to swing the collecting mechanism to a position where the free ends of the tines will be free from the surface of the soil. The lever can be also operated in a manner which will permit the free ends of the tines to be advanced into engagement with the soil under such pressure as may be required in consideration of the condition of the soil.

The collecting mechanism is so constructed, as will be evident from the foregoing, that, after the machine has travelled for the desired distance over the field, the mentioned mechanism may be readily operated to free the collected stones and permit the same to remain in a collected pile for subsequent removal in any suitable manner.

Having thus described the invention, what is claimed is:

In an apparatus of the character described, a supporting frame, an axle carried thereby and supporting wheels, a transversely extending head mounted upon the axle for movement therearound, the rear face of said head having a plurality of vertically elongated recesses, a plurality of tines, each tine having at its butt end an angularly disposed vertical lug having a size the same as the size of said recess and fitting entirely therein, a rectangular frame comprising parallel side bars, one of said side bars being formed with a plurality of openings equal in number to the tines, each of said openings having an area equal to the cross sectional area of the tine shank, said bar fitting against the face of the head, the other bar having a plurality of vertically disposed slits through which the tines pass.

In testimony whereof I hereunto affix my signature in the presence of two witnesses.

FRED J. FOWLER.

Witnesses:
  M. S. LANIER,
  WADE C. HOYT.

Copies of this patent may be obtained for five cents each, by addressing the "Commissioner of Patents, Washington, D. C."